June 9, 1959  D. N. BEEBE  2,889,807
DOG LEASH ASSEMBLY
Filed April 15, 1957  2 Sheets-Sheet 1

INVENTOR.
DOUGLAS N. BEEBE
BY
Knox & Knox

June 9, 1959  D. N. BEEBE  2,889,807
DOG LEASH ASSEMBLY
Filed April 15, 1957  2 Sheets-Sheet 2

INVENTOR.
DOUGLAS N. BEEBE
BY
Knox & Knox

United States Patent Office 2,889,807
Patented June 9, 1959

2,889,807

DOG LEASH ASSEMBLY

Douglas N. Beebe, San Diego, Calif.

Application April 15, 1957, Serial No. 652,713

6 Claims. (Cl. 119—109)

This invention relates generally to leashes and more particularly to improvements in a leash and leash container assembly of a type suitable for permanent securement to a dog collar or the like.

The primary object of this invention is to provide, in a self-retracting dog leash assembly, specific means for connecting the leash to a winding drum in such manner that this connection shall have optimum strength with minimum likelihood of deterioration of the leash at its point of contact, even though the leash be repeatedly unwound and rewound on the drum.

Another object of this invention is to provide means for attachment of the leash to a winding drum, characterized for optimum ease of assembly, during the original fabrication, this feature relating to the original mounting of the leash on the drum, as well as the assembly of the other component portions of the apparatus.

More specifically it is an object of this invention to provide a self-retracting dog leash assembly, a winding drum with slits in the curved wall portion thereof, and a removable end plate to allow easy mounting of a loop on the end of the leash so that the loop is threaded through said slits while maintaining a generally encircling relationship to the drum, thus obviating the necessity for rivets or the like.

Another object of this invention, ancillary to the preceding objects, is to provide a connection of the leash to the winding drum in such manner that the leash is not sharply bent or creased at any point, this feature being conducive to prolonged useful life of the leash.

Yet another object of this invention is to provide a drum construction characterized by the use of a removable, circular disk at one end of the drum, whereby the assembly of the apparatus is facilitated.

A final object to be mentioned herein, is to provide an improved leash and leash container assembly including a subassembly which facilitates the actual original fabrication of the device and the leash per se has a handhold spreader element which also functions as a stop to prevent complete withdrawal of the leash into the casing.

With these objects definitely in view, along with other objects which will appear hereinafter as this description proceeds, this invention resides in the novel combination, arrangement and construction of elements and portions as exemplified in the embodiment hereinafter described in the specification, particularly pointed out in the claims, and illustrated in the accompanying drawings, in which:

Similar characters of reference indicate similar or identical portions or elements throughout the specification and throughout the different figures in the drawings.

Figure 6:
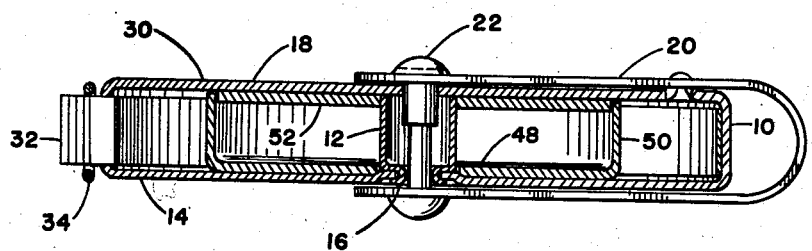
Figure 6 is a vertical cross-sectional view, taken substantially on the line 6—6 in Figure 2.

Referring now to the drawings in detail, the casing 10 is represented as generally cylindrical and, of course, hollow with an axis member, as best illustrated in Figure 6, secured to one end plate 14 of the casing as indicated at 16. The axis member 12 abuts the other end plate 18 and functions as a spacer element as well as an axis or bearing element. A clevis 20 is secured by the axis pin in co-axial relation to the axis member 12. The axis pin may be constituted of two interthreaded components as indicated in Figure 6.

A link 24 is employed to connect the clevis 20 with the dog collar 26, this connection being of a substantially permanent character, since the casing will be carried by the animal at all times. An opening 28 is provided at one side of the casing 10 and a strap-like liner 30 is fitted snugly within the cylindrical wall portion of the casing. This liner 30 has a pair of opposed ears 32 and a simple link 34 is snapped around these ears 32 which project through the opening 28 and the link 34 is thus positioned in registry with the opening 28. The link 34 thus functions as a means for connecting the ears 32 and this link has a second function as an anti-wear element to guide the leash 36 by frictional contact with the lateral edges thereof.

Figures 1, 2, 3, 4:
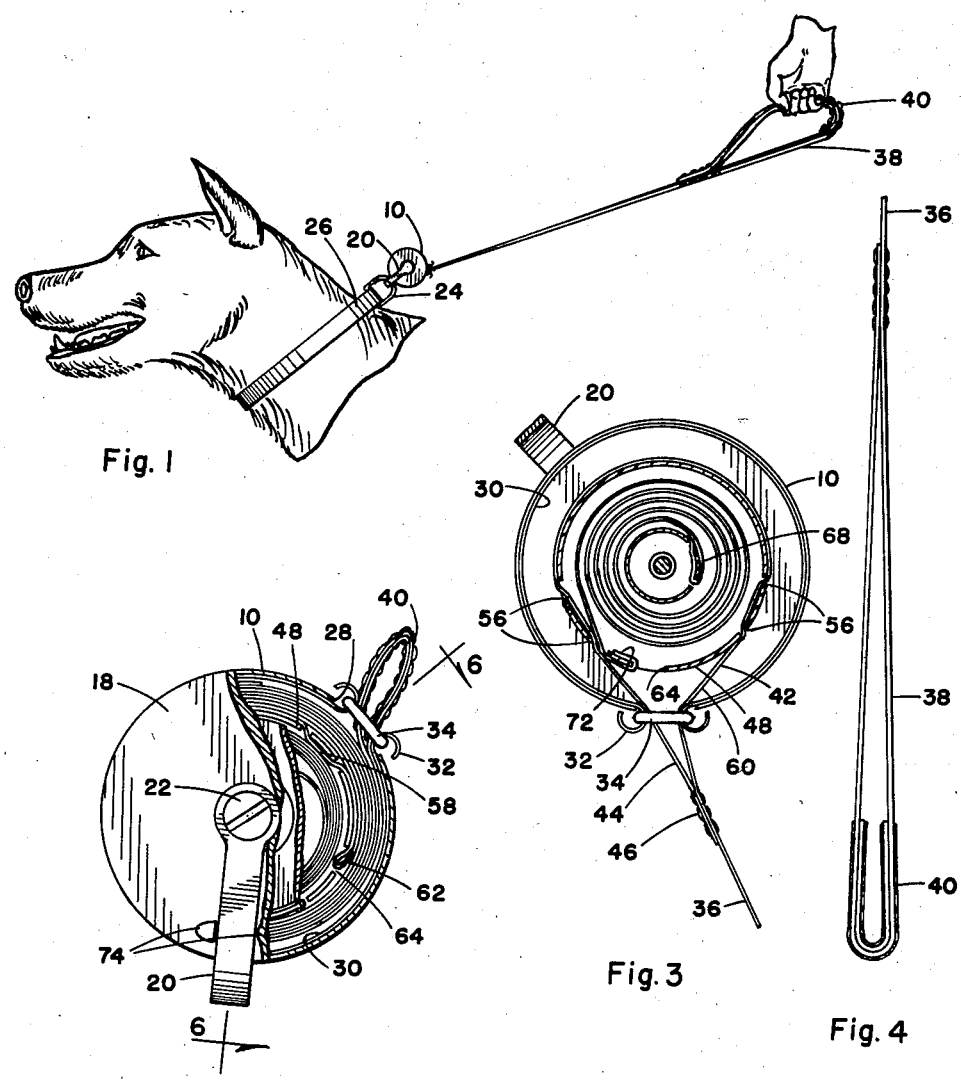
Figure 1 is a side elevational view of the apparatus, shown attached to a dog collar and with the leash manually held in partially extended position.
Figure 2 is a side elevational view of the leash assembly, the leash being shown as fully retracted, the casing being partially broken away and the circular disk constituting one side of the winding drum being also partially broken away to show the underlying portion.
Figure 3 is a horizontal sectional view with the leash shown fragmentarily as fully extended or unwound, the leash as well as the casing liner and spring being shown in plan to simplify representation.
Figure 4 is a fragmentary plan view of the outer or handhold end portion of the leash.
Figure 5:
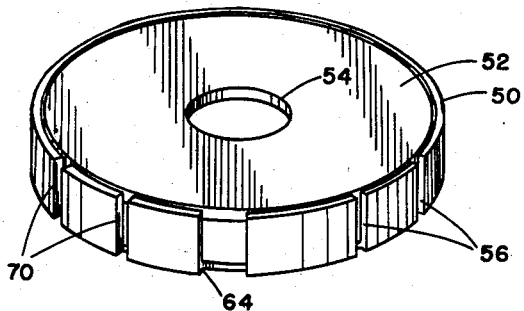
Figure 5 is an isometric view of the drum and circular disk which is employed as an end plate of the drum.

The leash has a looped terminal handhold 38 which is provided with a combination stop and spreader element 40 which may be constituted of merely a thickened portion of the looped terminal handhold 38 or some other semi-rigid material which may be secured as indicated in Figure 4 to effect the spreading of the handhold 38 to facilitate the entry of the fingers thereinto. The second function of the combined stop and spreader element 40 is clearly illustrated in Figure 2, wherein it is shown how the element 40 functions as a stop to prevent the complete withdrawal of the leash into the casing 10.

The inner end of the leash 36 has a loop 42 with a terminal portion 44 having its extremity secured as at 46 to an adjacent portion of the leash. Within the casing there is mounted the hollow winding drum 48, this drum comprised of a thin cylindrical wall 50 and an integral end plate, the other end plate being a circular disk 52 having an outer diameter to fit snugly within the rim portion of the thin cylindrical wall 50, the disk being axially apertured as at 54 to admit the axis member 12, and the drum should be thought of as being freely journaled on the axis member 12.

The drum is provided with pairs of slits 56 extending through the curved circular portion 50 thereof and spaced apart slightly to provide for the threading thereinto of the loop 42 for impositive, frictional engagement with the drum, all as best illustrated in Figures 2 and 3. As the leash is wound upon the drum 48, a portion 60, indicated in Figure 3, must be return bent as indicated at 62 in Figure 2. To prevent a sharp creasing of the material of the loop at the point 62, the thin cylindrical wall 50 is recessed or cut away as indicated at 64. This simple expedient has been found to increase the useful life of the leash to a remarkable degree.

A spiral spring 68 is operatively mounted in the drum 48, the inner end of said spring being secured to the axis member 12 and the outer end of the spring being positively secured to the drum as indicated at 72. The spring 68 is pre-stressed to rotate the drum and thus wind the leash thereon whenever the tension on the leash is reduced.

Although the leash is impositively and frictionally secured to the drum 48, there has been found that, provided the proper initial relationship, as illustrated in Figure 3, is originally attained in the assembly of the device, there is little tendency for the leash to creep and the original relationship of the loop 42 and recessed or cut away portion 64 of the drum will be maintained indefinitely. Since the spring 68 applies torque to casing 10 when the leash is tensioned, it has been found that the friction on the leash is lessened and the operation of the device generally improved when the opening 28, ears 32 and link 34 are disposed at an angle of approximately 135 degrees from the clevis 20. The clevis 20 is fixed at this angle by opposing stops 74 which may comprise upset portions of the casing 10. It will be obvious also that the tension on the leash is transmitted by the loop 42 to the drum as a whole and that the other objects of the invention are fully obtained by the illustrated embodiment.

Minor variations from the form of the invention detailed herein may be resorted to without departing from the spirit and scope of the instant invention.

Having described my invention, what I claim as new and desire to secure by Letters Patent is:

1. A dog leash assembly for substantially permanent attachment to a dog collar, said leash assembly comprising: a casing having an opening; a drum rotatively mounted in said casing; spring means engaging said drum to bias the drum toward rotation in one direction; and a leash extending through said opening and windable on said drum; said leash having a loop at one end thereof defined by a terminal portion of the leash having its extremity permanently secured to an adjacent portion of the leash; said loop encircling said drum; said drum having portions for impositive and continuous frictional engagement with said leash to assure initiation of rewinding onto said drum, whereby the connection of the leash with the drum is of optimum strength and original assembly of the leash onto said drum is facilitated.

2. Apparatus according to claim 1 wherein said loop has a return bent portion when wound on said drum and said drum has a recessed portion to accommodate said return bent portion so that the leash is not creased and weakened at said return bent portion.

3. A dog leash assembly for substantially permanent attachment to a dog collar, said leash assembly comprising: a casing having an opening; a drum rotatively mounted in said casing; spring means engaging said drum to bias the drum toward rotation in one direction; and a leash extending through said opening and windable on said drum; said leash having a loop at one end thereof defined by a terminal portion of the leash having its extremity permanently secured to an adjacent portion of the leash; said loop encircling said drum; said drum having portions for impositive and continuous frictional engagement with said leash to assure initiation of rewinding onto said drum, whereby the connection of the leash with the drum is of optimum strength and original assembly of the leash onto said drum is facilitated; said drum being a hollow cylinder defined by a thin wall and having an open end; said means to bias being a spiral spring operatively mounted within said drum; and said thin wall having slits through which said loop is threaded for said impositive and frictional engagement, said open end of the drum facilitating such threading of the loop and the original insertion of the spring into said drum during assembly of the apparatus.

4. A dog leash assembly for substantially permanent attachment to a dog collar, said leash assembly comprising: a casing having an opening; a drum rotatively mounted in said casing; spring means engaging said drum to bias the drum toward rotation in one direction; and a leash extending through said opening and windable on said drum; said leash having a loop at one end thereof defined by a terminal portion of the leash having its extremity permanently secured to an adjacent portion of the leash; said loop encircling said drum; said drum having portions for impositive and continuous frictional engagement with said leash to assure initiation of rewinding onto said drum, whereby the connection of the leash with the drum is of optimum strength and original assembly of the leash onto said drum is facilitated; said drum being a hollow cylinder defined by a thin wall and having an open end; said means to bias being a spiral spring operatively mounted within said drum; and said thin wall having slits through which said loop is threaded for said impositive and frictional engagement, said open end of the drum facilitating such threading of the loop and the original insertion of the spring into said drum during assembly of the apparatus; and a circular disk disposed coaxially of the drum and within said open end to support said thin wall against collapse when tension is placed on said leash.

5. Apparatus according to claim 4 and wherein said casing has an axis member, and said circular disk is in engagement with said axis member as well as with said thin wall.

6. A dog leash assembly for substantially permanent attachment to a dog collar, said leash assembly comprising: a casing having an opening; a drum rotatively mounted in said casing; spring means engaging said drum to bias the drum toward rotation in one direction; and a leash extending through said opening and windable on said drum; said leash having a loop at one end thereof defined by a terminal portion of the leash having its extremity permanently secured to an adjacent portion of the leash; said loop encircling said drum, whereby the connection of the leash with the drum is of optimum strength and original assembly of the leash onto said drum is facilitated.

References Cited in the file of this patent

UNITED STATES PATENTS

| | | |
|---|---|---|
| 610,088 | Scheerer | Aug. 30, 1898 |
| 2,434,119 | Nordmark | Jan. 6, 1948 |
| 2,480,335 | Nordmark | Aug. 30, 1949 |
| 2,799,245 | Ruggiero et al. | July 16, 1957 |
| 2,833,027 | Foster | May 6, 1958 |

FOREIGN PATENTS

| | | |
|---|---|---|
| 1,063,551 | France | Dec. 16, 1953 |